(12) United States Patent
Singh et al.

(10) Patent No.: US 6,453,430 B1
(45) Date of Patent: Sep. 17, 2002

(54) APPARATUS AND METHODS FOR CONTROLLING RESTART CONDITIONS OF A FAULTED PROCESS

(75) Inventors: Daljeet Singh, Morgan Hill, CA (US); John G. Waclawsky, Fredrick, MD (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/305,947

(22) Filed: May 6, 1999

(51) Int. Cl.$^7$ ............................................. G06F 11/00
(52) U.S. Cl. ........................................ 714/47; 712/227
(58) Field of Search ............................ 714/47, 48, 38, 714/37, 25, 30, 10, 39; 712/226, 227, 231, 245

(56) References Cited

U.S. PATENT DOCUMENTS

| | | | | |
|---|---|---|---|---|
| 4,635,258 A | * | 1/1987 | Salowe ........................ | 371/16 |
| 4,703,481 A | * | 10/1987 | Fremont ....................... | 371/12 |
| 4,740,969 A | * | 4/1988 | Fremont ....................... | 371/12 |
| 5,138,617 A | * | 8/1992 | Edwards ..................... | 371/16.1 |
| 5,193,186 A | | 3/1993 | Tamaki et al. .............. | 395/650 |
| 5,500,809 A | | 3/1996 | Nakai ......................... | 364/580 |
| 5,513,315 A | * | 4/1996 | Tierney et al. ......... | 395/183.13 |
| 5,537,539 A | * | 7/1996 | Narihiro ................ | 395/183.14 |
| 5,715,386 A | | 2/1998 | Fulton, III et al. ..... | 395/183.14 |
| 5,748,882 A | | 5/1998 | Huang .................... | 395/184.01 |
| 5,784,607 A | * | 7/1998 | Henry et al. ................. | 395/595 |
| 5,862,308 A | * | 1/1999 | Andress et al. ......... | 395/182.08 |
| 5,905,857 A | * | 5/1999 | Buzby et al. .......... | 395/183.14 |

* cited by examiner

Primary Examiner—Nadeem Iqbal
(74) Attorney, Agent, or Firm—Chapin & Huang, L.L.C.; Barry W. Chapin

(57) ABSTRACT

A system including a method and apparatus are provided for controlling fault conditions in a computer controlled device such as a data communications device. The invention can preferably be provided in a process restarter mechanism within an operation system. In operation, the process restarter system detects improper execution (i.e., detects a processing failure) of a set of instructions and initiates execution of the set of instructions in response to the operation of detecting. The system then repeats the operation of detecting and initiating according to a first restart sequence and then repeats the operation of detecting and initiating according to a second restart sequence. The second restart sequence initiates execution of the set of instructions in a different sequence than the first restart sequence. For example, the first restart sequence may perform process restarts quickly after failure detection, while the second restart sequence performs process restarts after longer and longer periods of time after failure detection. The quick restarts of the first restart sequence initially provide for maximum process uptime, and the delayed or progressively backed-off restarts allows a fault condition causing process failure to be remedied. The second restart sequence can include the use of helper processes which provide passive or active fault management. In active fault management using helper processes, the helper processes can diagnose and correct the fault condition(s) causing the improper execution of the set of instructions. Passive fault management helper processes can diagnose the fault condition and report back to the process restarter. By providing delayed restarts in the second restart sequence along with helper processes, fault management in a device equipped with the invention helps ensure proper and prolonged device operation with minimized system resource over-utilization.

35 Claims, 5 Drawing Sheets

APPARATUS AND METHODS FOR CONTROLLING RESTART CONDITIONS OF A FAULTED PROCESS

BACKGROUND OF THE INVENTION

Modem computer controlled devices rely heavily on the proper functioning of software processing to control their general operation. Typically in such devices, an operating system is made up of one or more software programs that execute on a central processing unit (CPU) in the device and schedules the operation of processing tasks. During execution, the operating system provides routine processing functions which may include device resource scheduling, process control, memory and input/output management, system services, and error or fault recovery. Generally, the operating system organizes and controls the resources of the device to allow other programs or processes to manipulate those resources to provide the functionality associated with the device.

Modem central processing units (i.e. microprocessors) can execute sequences of program instructions very quickly. Operating systems which execute on such processors take advantage of this speed by scheduling multiple programs to execute "together" as individual processes. In these systems, the operating system divides the total available processor cycle time between each executing process in a timesliced manner. By allowing each process to execute some instructions during that process-designated timeslice, and by rapidly switching between timeslices, the processes appear to be executing simultaneously. Operating systems providing this capability are called multi-tasking operating systems.

Fault management and control in devices that execute multiple processes is an important part of device operation. As an example of fault control, suppose that a first process depends upon a second process for correct operation. If the second process experiences an error condition such as failing outright, hanging or crashing, the first dependent process may be detrimentally effected (e.g., may operate improperly).

Fault control in some form or another is usually provided by the operating system, since the operating system is typically responsible for dispatching and scheduling most processes within a computer controlled device. Many prior art operating systems and device control programs include some sort of process-monitoring process such as a dispatcher process, a monitor daemon, a watchdog process, or the like. One responsibility of such monitoring processes is to restart failed, hung or crashed processes.

As an example, prior art U.S. Pat. No. 4,635,258, issued Jan. 6, 1987, discloses a system for detecting a program execution fault. This patent is hereby incorporated by reference in its entirety. The fault detection system disclosed in this patent includes a monitoring device for monitoring the execution of program portions of a programmed processor for periodic trigger signals. Lack of trigger signal detection indicates a fault condition and the monitoring device generates a fault signal in response to a detected faulty program execution condition. Logic circuitry is included for restarting a process that the monitoring device indicates has faulted. The monitoring device may require a predetermined number of trigger signals before indicating an alarm condition. The system also includes circuitry for limiting the number of automatic restarts to a predetermined number which avoids continuous cycling between fault signal generation and reset.

SUMMARY OF THE INVENTION

Prior art fault management systems can experience problems in that these systems restart a failed process with little or no regard to why the process faulted in the first place. Prior art systems using this approach can heavily burden the processor and other system resources, since restarting a process can require significant overhead. In extreme cases, high system overhead may have caused the fault in the first place, and the prior art restart mechanisms which further load the system only serve to compound the problem.

Furthermore, by not determining the cause of the fault, prior art systems that simply restart faulted processes may end up creating lengthy, and possibly "infinite" process restarting loops. Such loops may over-utilize system resources such as processor bandwidth and memory in attempts to endlessly rejuvenate a failed process that may be failing due to an external event beyond the control of the process.

Those prior art systems that attempt restarts with only a limited number of allowed restarts may avoid the problem of endless process restarting loops, but still suffer from system over-utilization during the restart period.

In contrast, the present invention provides a unique approach to fault management. In this invention, fault conditions related to processes can be handled passively, actively, or both passively and actively through the use of a unique process restart sequences. Passively handling faults, called passive fault management, comprises detecting faults and waiting for a period of time for condition that lead to the fault to change and the fault to correct itself. On the other hand, active fault management attempts to determine the cause of the fault and to remedy the situation thereby preventing future faults.

In this invention, the process restart sequences allow restarting of failed process according to a sequence or schedule that manages the loads placed on system resources during failure and restarting conditions while maintaining the utmost availability of the process. In real-time or mission critical environments, such as in data communications networking devices or applications, the invention provides significant advancements in fault management.

More specifically, embodiments of the present invention relate to systems, methods and apparatus for handling processing faults in a computer system. According to a general embodiment of the invention, a system provides a method of detecting a fault condition which causes improper execution of a set of instructions. The system then determines a period of time to wait in response to detecting the fault condition and waits the period of time in an attempt to allow the fault condition to be minimized. This is an example of passive fault management. The system then initiates execution of the set of instructions after waiting the period of time. The system then repeats the operations of detecting, determining, waiting and initiating. Preferably, each repeated operation of determining a period of time determines successively longer periods of time to wait. Accordingly, this embodiment of the invention provides a passive process restart back-off mechanism that allows restarting of processes in a more controlled and time-spaced manner which conserves system resources and reduces peak processing loads while at the same time attempting to maintain process availability.

Preferably, the system is implemented on a computer controlled device, such as a data communications device. The device includes a processor, an input mechanism, an output mechanism, a memory/storage mechanism and an interconnection mechanism coupling the processor, the input mechanism, the output mechanism, and the memory/storage mechanism. The memory/storage mechanism maintains a process restarter. The process restart is preferably a process or program that executes as part of, or in conjunction with the operating system of the device. The invention is preferably implemented in an operating system such as the Cisco Internetworking Operating System (IOS), manufactured by Cisco Systems, Inc., of San Jose, Calif.

The process restarter executes in conjunction with the processor and detects improper execution of a set of instructions on the processor and re-initiates execution of the same set of instructions in response to detecting improper execution. The process restarter also repeatedly performs the detecting and initiating operations according to a first restart sequence, and repeatedly performs the detecting and initiating operations according to a second restart sequence. The second restart sequence causes the process restarter to initiate execution of the set of instructions in a different sequence than the first restart sequence. In the second restart sequence, the process restarter performs the operation of detecting, and then waits for expiration of a restart interval before performing the operation of initiating.

Each restart interval between successive repetitions of the second restart sequence becomes progressively longer in duration. Also, each restart interval can be computed, depending upon the embodiment, based on a formula based on at least one of a geometric, an exponential, a logarithmic, an incremental, a progressive, a linear, an increasing, a decreasing and a random pattern.

The computer controlled device can also include a helper process that resides in the memory/storage mechanism and executes in conjunction with the processor. The helper process executes, preferably, during the expiration period of the restart interval during the second restart sequence in order to diagnose and correct at least one fault condition causing the improper execution of the set of instructions detected by the process restarter.

According to another embodiment, a method is provided which detects improper execution of a set of instructions. The set of instructions may be a process or program which is executing (or is interpreted) on a device, or may be a routine, sub-routine, procedure, code, thread, macro, interpreted series of statements, and so forth. The system of the invention initiates execution of the set of instructions (e.g., restarts the process) in response to detecting the improper execution. Then the system repeats the steps of detecting and initiating according to a first restart sequence. The first restart sequence defines the time sequencing and the number of times that the detecting and initiating operations are performed, and preferably performs the operation of initiating execution of the set of instructions immediately or shortly after, and in response to, the step of detecting the improper execution. In this manner, the first restart sequence attempts to restart the process as quick as possible for a limited number of detected failures, and then enters into the second restart sequence.

According to one aspect of the first restart sequence, the system detects a fault condition associated with the set of instructions and determines if the fault condition exceeds a maximum number of fault conditions associated with the first restart sequence. If the maximum number has not been exceeded, the system initiates execution of the set of instructions, such that upon each successive step or operation of detecting and initiating according to the first restart sequence, execution of the set of instructions is quickly initiated (e.g. restarted). The restarting can be done immediately, or a short amount of time can be provided to allow the operating system or failed process to be cleaned up (i.e., processing resources freed and memory released).

After the first restart sequence has completed its attempt to restart the failed process quickly after each failure, if the improper execution of the set of instructions (i.e., the process failure) continues to be detected, the system repeats the operations of detecting and initiating according to a second restart sequence.

The second restart sequence initiates execution of the set of instructions in a different sequence than the first restart sequence. In one embodiment, the second restart sequence performs each step of initiating in response to the step of detecting after expiration of a current time interval that is different than a former time interval of a former repetition of the second restart sequence. In a another embodiment, the current time interval is greater than the former time interval, such that each repetition of the second restart sequence initiates execution of the set of instructions after waiting progressively longer time intervals in response to the step of detecting.

Unlike the first restart sequence that provides quick or immediate restarts, the second restart sequence provides different time intervals after each failure detection in order for the fault to be remedied before again reinitiating the set of instructions that form the process. The time intervals (restart intervals) preferably get larger as failure progress, though the invention can include embodiments in which the time intervals get smaller or are simply random or selected by another mechanism which makes two successive time intervals different from one another. The embodiments summarized thus far that use the second restart sequence are also examples of passive fault management, in that the second restart sequence does not, in these embodiments, proactively attempt to correct the failure, other than by restarting the process after varying delay or restart intervals.

Other embodiments of the invention provide that the delays between process restarts in the second restart sequence can be user or device administrator programmable or can be specified from information provided by the process (which is being successively restarted). The second restart sequence can also base process restart intervals (the time between failure and restart, or between a former restart and a current restart) on a mathematical time-based algorithm system that includes one or more of the following progressions for the restart intervals: geometric, exponential, logarithmic, incremental, progressive, linear, increasing, decreasing or random or may use another formula-based system to determine the restart interval.

According to a more specific embodiment of the invention, the second restart sequence performed by the system of the invention determines a runtime for the set of instructions. Then the system determines a next restart interval based on the runtime for the set of instructions. The step of initiating execution of the set of instructions is then performed after expiration of the next restart interval and upon each repetition of the second restart sequence, the next restart interval is different.

The next restart interval determined in each successive repetition of the second restart sequence can be progressively longer in duration that a next restart interval determined in a former repetition of the second restart sequence. To determine a next restart interval, the system in one embodiment determines if the runtime for the set of instructions is less than a current restart interval, and if so, advances the next restart interval based on the current restart interval. In another embodiment, the next restart interval uses the runtime for the set of instructions to select a next restart interval from a set of next restart intervals associated with the second restart sequence. The restart intervals may be stored in a table, list, or other file or data structure, or may be provided by the process or may be programmed by a device administrator, or may be calculated during processing.

To end the second restart sequence, the system in one embodiment determines if the runtime for the set of instructions exceeded a current restart interval, and if so, initiates execution of the set of instructions and terminates the second restart sequence. This aspect of the invention assumes, for instance, that if a process can successfully execute for a period of time that exceeds the current restart interval, then the former failure condition has disappeared and some new event is most likely causing the process to fail. As such, this new failure condition should be handled by returning to use of the first restart sequence followed by the second.

According to the various embodiments of the invention, the operation of determining the time between the steps of detecting and initiating in either or both the first and second restart sequences can be programmable. Also, the operation of initiating in the second restart sequence can be performed at an elapsed time interval measured from a former step of detecting, or can be performed at an elapsed time interval measured from a former step of initiating.

The operation of detecting improper execution of a set of instructions in embodiments of the invention can also detect a fault due to a resource required by the set of instructions. For example, the fault may be due to a hung, crashed, or failed process required by the set of instructions. Alternatively, the fault may be simply that a correctly executing process is so busy or is so over-utilized that it cannot adequately supply its functionality to, for example, other process or system resources which rely on the process. Thus the definition of fault and improper execution of a set of instructions in this invention is relative to the application of the device and may range from a process being very busy or sluggish to respond to the process actually functioning improperly or not at all or no longer existing within the device.

In embodiments which use active fault management, an operation is included in the system of the invention which initiates execution of a set of helper instructions (e.g. helper process(s)) in response to the step of detecting improper execution of a set of instructions during the second restart sequence. The set of helper instructions performs functions to assist in the handling of processing faults in the computer system. There may be one or many sets of helper instructions and each set may execute as a separate helper process or within a single large helper process.

The helper processes are designed to assist in fault diagnosis and correction, and are an example of active fault management. Some helper processes may merely perform passive diagnostic actions, while others may be proactive and can seek-out and remedy fault conditions causing the improper execution of instructions. In the case of multiple helper processes, the set of helper instructions can be selected based upon the next restart interval, where each interval has a specific associated helper process. The helper processes can vary in their level of robustness or processing capabilities with respect to how detailed their fault analysis and correction capabilities can extend.

The invention also provides an embodiment which includes a method for fault management in a computer controlled device. This method embodiment includes the steps of detecting a fault condition associated with a process and determining a runtime for the process. A step of determining a restart interval based on the runtime for the process is also included. Also, a step is provided of executing a helper process associated with the restart interval to diagnose and remedy the fault condition associated with the process. The helper process preferably executes during expiration of the restart interval. The embodiment also includes a step of initiating execution of the process after expiration of the restart interval.

Another embodiment comprises a computer program product having a computer-readable medium including computer program logic encoded thereon for controlling faults in a computer controlled device, such that the computer program logic, when executed on at least one processing unit within the computer controlled device, causes the at least one processing unit to perform the steps of the method embodiments described herein.

Yet another embodiment provides a process control block data structure maintained in a computer readable medium, such as in memory or on a disk. An example of such a process control block data structure is one that is maintained by an operating system. The process control block data structure maintains information about an instantiation of a process and information about at least one restart pattern used to reinitiate the process in the event of a failure of the process.

A propagated signal embodiment provides a propagated signal that contains a process control block data structure. The process control block data structure maintains information about an instantiation of a process and information about at least one restart pattern used to reinitiate the process in the event of a failure of the process.

Through the use of the above embodiments, the invention can precisely control process restarting sequences in the event of process failures. Using the first and second restart sequences, the invention can minimize downtime of a process. The invention also helps ensure correct overall system and device operation by proactively managing and controlling system resources in response to processing faults. By controlling process re-instantiation, propagation of fault conditions is controlled which helps to avoid recursive processing failures. The invention also helps prevent overuse of system resources during process re-instantiation and termination by spacing process restarts out over time. The time intervals between process restarts can be programmable which allows a user or device administrator to define specific sequences and offers flexibility that can be made dependent upon the application of the specific device using the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
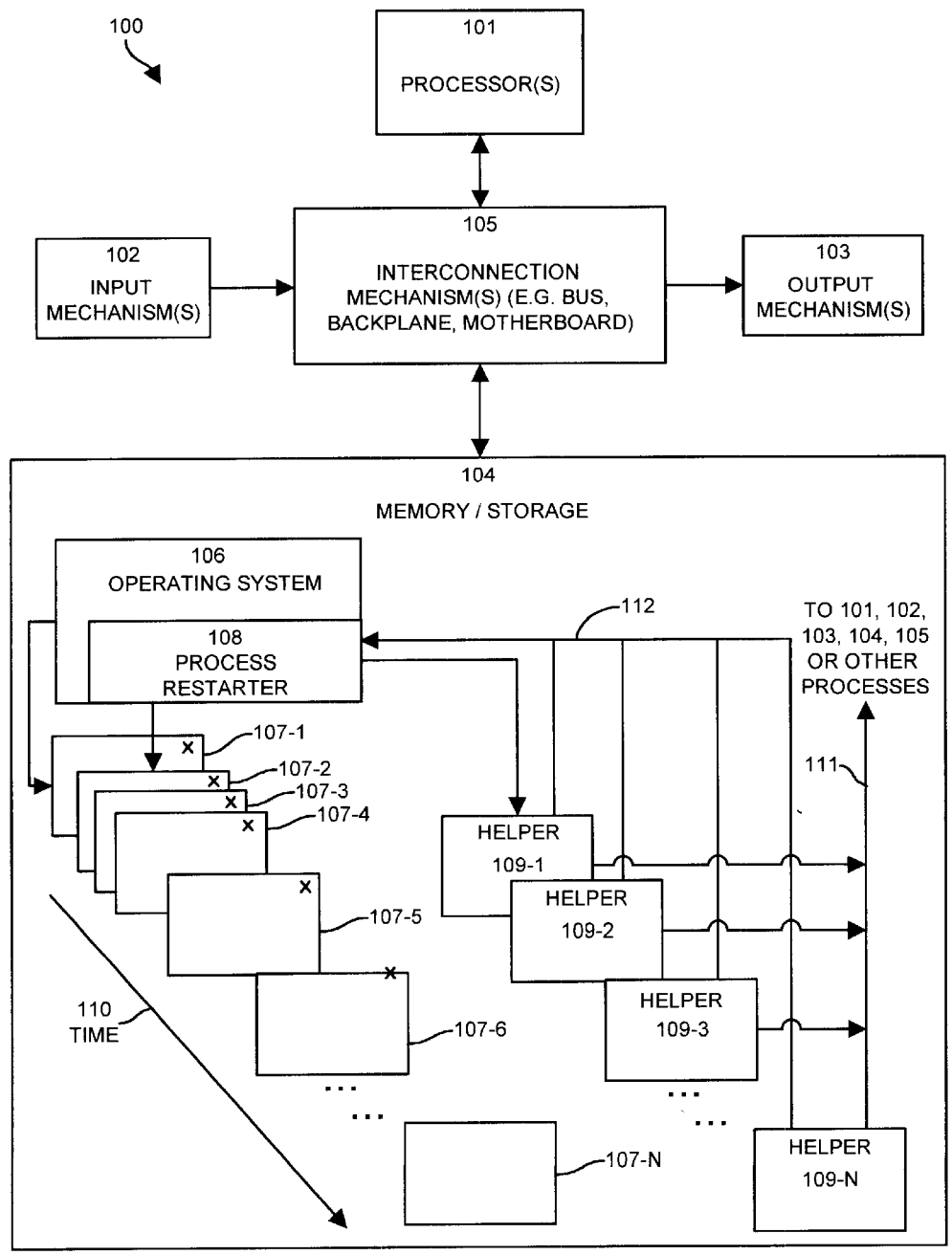
FIG. 1 illustrates an example architecture of a computer controlled device configured according to the invention.

FIG. 1 illustrates an example architecture of a computer controlled device 100 configured according to this invention. The example device 100 includes an interconnection mechanism 105 which couples a processor 101, an input mechanism 102, an output mechanism 103 and a memory/storage mechanism 104 (e.g., a disk, random access memory (RAM), read-only memory (ROM), etc.). The memory/storage mechanism 104 stores and maintains programs and processes such as an operating system 106 and a process 107 (represented by successive individual executions 107-1 through 107-N of the process 107). The operating system 106 is one or more computer programs that execute on the processor 101 and controls the operation and execution of computer program processes, such as process 107. In this example configuration, the operating system 106 includes a process restarter 108 which provides much of the processing capabilities described as the invention. The device 100 in FIG. 1 is representative of any type of computer system or computer controlled device that processes data, such as a data communications device.

A data communications device is used as an example device employing the invention in this description because the invention provides features which are beneficial to such devices. Data communications devices that use the invention are more resilient to processing faults, which provides more reliable communications over a network, for example. Examples of data communications devices in which this invention can be employed are routers, switches, hubs, gateways, network access servers, proxy servers, network bridges, data repeaters, modems, protocols converters, and other types of devices that rely on the correct execution of processes for proper operation. It is to be understood, however, that the invention can also be applied to any type of computer controlled device, such as a general purpose or dedicated computer system.

The invention can implemented as part of an operating system (e.g. process restarter 108 in operating system 106 in FIG. 1) or another control program that oversees general processing operations on a device (e.g., 100). An example of an operating system in which the invention may be employed that controls data communications devices such as those noted above is the Cisco Internetworking Operating System (Cisco IOS) manufactured by Cisco Systems, Inc. of San Jose, Calif.

The invention can be used to detect and manage faults in programs operating in or on a device. In this description, a program generally includes sets of program instructions or statements such as object code, while the term process generally refers to the sets of instructions (i.e., a program's code) which execute or that are interpreted on the processor 101 as well as any associated data or state information which is required, created or maintained during execution of the sets of instructions (e.g., program code). Generally, the terms "process" and "program" are interchangeable and thus a process or program may be any set of instructions that is executed or interpreted. A process or program may be a standalone individually executing program, or may be a procedure, subroutine or part of a larger program, or may be a task, thread, macro, script, command file, application, daemon, operating system process or program, or other executable or interpretable entity.

FIG. 1 provides a high-level explanation of the operation of certain aspects of the invention and is useful to assist in understanding more detailed concepts that are presented later. The invention allows the computer controlled device 100 to detect and control fault conditions that occur during operation (e.g. execution or interpretation) of processes (e.g. 106, 107) that execute on the device 100 and provides a unique process restart mechanism (108) which inhibits fault effects from propagating to other processes or components in the device 100. Fault management in this invention can be provided either passively or actively, or may be provided both passively and actively. Passive fault management assumes an event causing a processing fault can correct itself within a computer system, while active fault management proactively initiates steps to resolve a fault causing condition. These concepts of the invention will be discussed more thoroughly using specific examples.

During normal operation of a device 100 configured according to the invention, the operating system 106 is provided with the process restarter 108 which allows the device 100 to monitor one or more processes (e.g., process 107) and to detect and uniquely manage errors, problems, events, interrupts or faults that occur during execution of processes. The process restarter 108 is programmable and may exist as a separate standalone process or routine, or may be included within a watchdog routine, a fault control routine, a process monitoring or dispatch routine (e.g. dispatcher), or in another component that executes as part of the operating system 106. Generally, the process restarter 108 minimizes the effects of processing faults in the overall device 100 by detecting processing failures and restarting the failed processes or programs. The continuous detection and restarting of processes that experience fault conditions helps reduce the probability of other process failures or a global system failure due to interactions with the faulty process. This will minimize and contain the effects of a faulted process and helps avoid recursive processing failures, thus improving overall system reliability and availability.

In the example scenario illustrated in FIG. 1, process 107 is first initiated (i.e., started or executed) as process 107-1 by the operating system 106. During execution, the process restarter 108 monitors process 107 (which initially executes as 107-1) for fault conditions. In this illustration, an X in the upper right corner of a process (such as in process 107-1) indicates that the process has experienced a fault condition and is in a failed, crashed, hung or faulted state. If the process restarter 108 detects a fault condition associated with process 107, the process restarter 108 quickly restarts the failed, hung or faulted process. This is illustrated by process 107-2 which is started to replace process 107-1. The process restarter 108 then continues to repeat the sequence of monitoring for improper execution of process 107-2. In the event of a fault (i.e. improper execution) on process 107-2, the process restarter 108 again quickly re-initiates another instantiation of process 107, which is represented as process 107-3. According to the invention, the repetitive sequence of detecting improper execution (i.e. fault detection) followed by quickly restarting or re-initiating a failed process is called a first or quick restart sequence and is an example of the invention's use of passive fault management.

In this particular example, the first restart sequence is represented by the three quick re-initiations (i.e., re-executions) of the set of instructions which constitute process 107. That is, the first restart sequence is illustrated by the initial failed "X" process 107-1 (first execution), followed by 107-2 (first restart), 107-3 (second restart) and 107-4 (third restart). Time line 110 indicates the relative time that passes as each instantiation of process 107 continues to experience failure and is restarted according to the first restart sequence of the invention.

During the first or quick restart sequence in the invention, a failed or faulty process is rapidly replaced by the process restarter 108 when improper execution is detected. The process is replaced either with another execution of itself or by signaling the failed or hung process to restart, reset, or re-initiate itself. By detecting process fault conditions and quickly restarting the faulted process, any functionality provided by this process that is relied upon by other dependent processes or system components, such as input or output mechanisms 102, 103, is quickly replaced. In many cases, the first restart sequence may prevent dependent processes from experiencing fault conditions themselves. This example first restart sequence (e.g. executions and failures of 107-1, 107-2, 107-3 and final restart of 107-4) represents passive fault management since nothing is done to determine the cause of the fault condition causing the failures. Rather, the process (i.e. 107) experiencing the improper execution is simply restarted in the first in expectation that timing and system conditions which lead to the fault have changed.

If after a certain number of user-defined (i.e., programmable) quick restarts or process failures, the process restarter 108 continues to detect improper execution due to process fault conditions, the process restarter 108 enters into a second restart sequence. In the second restart sequence (beginning with the failure of process 107-4 and continuing through restarts 107-5 through 107-N in FIG. 1), a process that continues to fail is re-initiated (restarted) at different time intervals after each failure.

In the example illustrated in FIG. 1, if the process restarter 108 continues to detect failures of process 107 (executing at the end of the first restart sequence as the third restarted process 107-4) after the three quick restarts (107-2, 107-3, and 107-4) used in this example first restart sequence, the process restarter 108 then enters into the second restart sequence upon detecting a failure of process 107-4. The second restart sequence restarts instances of process 107 after waiting for progressively longer restart intervals (i.e. timed delays). That is, once the first restart sequence completes attempting the quick restarts in response to a first number of failures (e.g. three in this example), the second restart sequence takes over in which further successive process.failures trigger re-execution or re-initiation of the failed process, but only after waiting, for example, for progressively longer time intervals after each failure. The progressively longer time periods between process restarts in this example second restart sequence are illustrated in FIG. 1 by the more distant spacing along time line 110 between processes 107 after the failure of process 107-4 which begins the second restart sequence.

Each of the delays in the second restart sequence, which get progressively longer in this particular example, allow time after detection of a fault condition for system conditions to change which could allow the fault to correct itself before the failed process is again restarted. This aspect of the invention is based on an observation that faults or error conditions may be out of the control or external to the process which is failing. Such fault conditions may be due, for example, to an asynchronous event such as an external interrupt, a time-out, a data re-routing or re-scheduling condition, bus or processor contention, network congestion, buffer depletion, queue backup, packet re-transmission requirements, or another event or condition that is beyond the control of the successively failing process. These fault conditions or external events are often temporary in nature, lasting only for brief periods of time. For example, network congestion may only last during short periods of peak network utilization and then may disappear.

Based on this observation, once the failure of process 104-7 is detected (i.e., the last of the quick restarts of process 107), by allowing successively longer periods of time before restarts 107-5 through 107-N after each failure in the second restart sequence, time is provided for an event or fault condition that is external to the process to correct itself, be corrected, or to go away. In other words, a fault condition causing process failures may disappear during the period of time between the failure and the next restart. If the process restarter 108 detects successive process failures during the second restart sequence, before re-initiating the process upon each failure detection, the process restarter 108 waits for successively extended periods of time upon each failure detection, thus allowing the external event(s) causing the failure to be cleared.

The aforementioned example of the second restart sequence is another example of passive fault management. That is, the process restarter 108 does not proactively attempt to remedy or correct a fault condition, other than by restarting the failed or faulted instantiations of process 107.

The invention also provides an aspect involving active fault management. Through the use of helper processes 109-1 through 109-M (to be explained shortly), active fault management aspects of the invention attempt to remedy or correct a fault condition causing the process to improperly execute. Active fault management further attempts to ensure successful process execution and the correct overall operation of the device 100.

Helper processes 109-1 through 109-M illustrate an example of active fault management according to the invention. As illustrated in FIG. 1, individual helper processes 109-1 through 109-M can be initiated by the process restarter 108 in response to faults or detection of improper execution of instructions of a process and can interface 111 with other components of the device 100, such as the input mechanisms 102, the output mechanisms 103, the memory/storage mechanisms 104, the interconnection mechanisms 105, or other processes (e.g., portions of operating system 106). Via this interface 111, the helper processes 109 can query system resources 101–105 or processes for diagnostic information, and can signal to these resources or processes to change state.

Generally a helper process 109 is a specific process, program, procedure, routine, or function that is designed to independently determine and/or target the probable cause of errors, delays, events, faults, conditions or other issues related to one or more system resources or components (e.g., 101 through 105). There may be many different individual helper processes 109-1 through 109-M, each specifically designed to target a different potential problem that may be causing the fault conditions (improper execution) to appear in the failing process 107. Alternatively, there may be a single multi-faceted helper process 109 (reinitiated each time as instances 109-1 through 109-M) designed to check for and remedy external fault conditions in a variety of circumstances and/or system components. Preferably, the helper processes 109-1 through 109-M are initiated during the second restart sequence shortly after detection of improper execution of the monitored process (process 107 in this example).

For example, after process 107-4 (the last quickly restarted process 107) experiences a fault causing improper execution, the process restarter 108 enters the second restart sequence using, in this example, progressive delays or restart intervals between process restarts. Thus, the next initiation of process 107, which is illustrated specifically as process 107-5, does not immediately take place after failure detection in process 107-4. Instead, the second restart sequence determines and waits an amount of time called the restart interval, as explained above in the passive fault management configuration of the second restart sequence. However, if the second restart sequence is also configured for active fault management, a helper process 109-1 may be initiated after detection of the improper execution of process 107-4 but before initiation of process 107-5. That is, the helper process 109-1 executes as an independent process concurrently during the restart interval (i.e. waiting period) between process failure 107-4 and process restart 107-5.

One example function of the helper process 109-1 is to determine why the process 107 failed (107-4 in this example) for the fourth time. The failed process 107-4 (and the other former failed processes 107-1 through 107-3) may have been waiting for a system resource that is unavailable (e.g., buffer depletion or a resource caught in an infinite loop). As its name implies, the helper process 109-1 is designed to detect the cause of the fault condition and to help remedy the condition so that the next instantiation (i.e. 107-5) of process 107 will execute properly without experiencing failure. In the example of a data communications device 100, the helper process 109-1 may be designed to detect a congested network resource (e.g., a data port queue de-scheduler stuck in an infinite loop) and to provide a reset signal which may cause the congested system resource to return to normal operation. In the example of buffer depletion, the helper process 109-1 may expand the number of available buffers (i.e., allocate more buffer storage) or may perform garbage collection to provide more available memory for buffer space. After the process restarter 108 determines that the proper restart interval has passed since the failure of process 107-4, process 107-5 is initiated. Since the helper process 109-1 performs the remedial action to remedy the fault condition in the congested system resource (e.g., by expanding the number of available buffers) before restarting 107-5, the process 107-5 may continue executing without subsequent failures.

As the example configuration in FIG. 1 illustrates, there may be more than one helper processes 109-1 through 109-M. Each successive helper process beginning with 109-1 and ending with 109-M may contain more and more robust error or fault detection capabilities. As an example, the first helper process 109-1 may simply check the status of resources or data structures that are frequently access by instances of process 107. If one of those resources (e.g., an input mechanism 102) is in a fault state, the helper process 109-1, may signal or reset the faulted system resource. The second helper process 109-2, on the other hand, may contain more in-depth error and fault detection and correction capabilities, such as polling externally connected network devices (e.g., a remote router) to determine the operational status of a network component or of routing table accuracy as related to device 100.

As illustrated in FIG. 1, upon each successive failure that occurs during the second restart sequence (failures of processes 107-4 through 107-N), a different restart interval is used (i.e., preferably, more and more time is waited, as illustrated by the varying and increasing distances after process 107-4 and continuing through 107-N along time line 110) before restarting the next instance of process 107. Also, in this example, a different helper process 109-1 through 109-M may correspond to each particular restart interval. As the restart interval times become longer, the helper processes 109-1 through 109-M may become correspondingly more and more powerful in fault detection/correction capabilities and may require more time for system analysis, fault detection and fault correction.

As the above example illustrates, embodiments of the invention greatly alleviate problems associated with fault detection and handling. By using a first quick restart sequence to get the process 107 quickly "back-on-its-feet" (i.e., to get the process executing again in a normal or correct manner), the system of the invention localizes and minimizes many effects of processing faults. For example, by quickly attempting to rejuvenate the failed process, other process that depend on the failed process will experience minimal delays. If however, the quick restarting fails to instantiate a correctly operating process, the fault condition may be more complex and the second restart sequences begins. Upon entering the second restart sequence, which restarts the process, at different restart intervals, the system can either passively wait for a fault to clear itself, or the system can proactively remedy the fault by using a helper process 109.

Figure 2A:
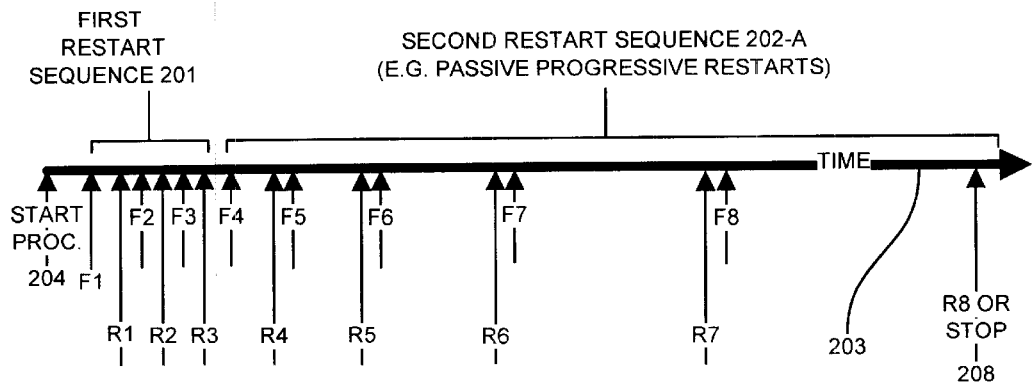
FIG. 2A illustrates an example of a process restart timeline showing process restart sequences performed according to one embodiment of the invention.
Figure 2B:
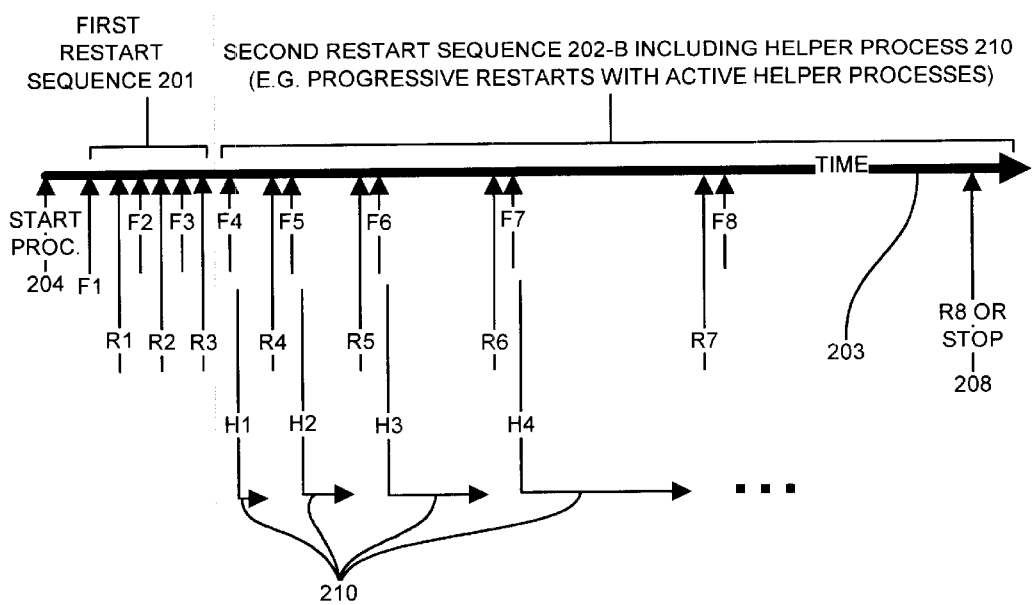
FIG. 2B illustrates an example of a process restart timeline showing process restart sequences including helper process execution performed according to another embodiment of the invention.

FIGS. 2A and 2B illustrate how the first and second process restart sequences 201, 202 of the invention handle process failures (indicated as failures F1 through F8) and process restarts (indicated as restarts R1 through R8) with respect each other on a timeline 203. FIG. 2A illustrates passive first and second restart sequences 201, 202-A, while FIG. 2B illustrates a passive first restart sequence 201 followed by an active second restart sequence 202-B that includes initiating helper processes H1 through H4, collectively labeled 210.

The timeline 203 represents the progression of time from left to right. While not specifically to scale, the relative spacing of process failures F1–F8 and restarts R1–R8 provides an indication as to the general operation of this example of the invention. In FIGS. 2A and 2B, it is possible that an external event is causing sets of instructions in the subject process (not specifically shown in these figures) to improperly execute (i.e., to fail). This assumption allows for an easier understanding of the full process restarting sequences 201, 202 in these figures.

In FIG. 2A, a process initially starts execution at location 204, as indicated by the label "START PROC." on the far left of the timeline 203. The process restarter 108 (FIG. 1) monitors the process for the detection of a fault condition and detects the first fault condition at F1 as indicated on timeline 203. The first fault F1 triggers the process restarter 108 to begin the first restart sequence 201. The first restart sequence 201 quickly restarts the process at R1 on timeline 203 in response to detecting the fault condition F1. Since the process in this example continually fails due to an external event, the restarted process R1 fails a second time at F2 after only a short amount of runtime. The failed process F2 is again quickly restarted a second time at R2. The second restarted process R2 also executes only for a short period of time and fails at F3 due to the external event causing the fault condition. The failed process F3 is again quickly restarted at R3. Process restart R3 is the third and final quick restart provided in this example first restart sequence 201.

The first restart sequence in this example restarts the failed process three times in response to the first three failures, respectively. One purpose of quick restarts is to make an attempt at getting the process "back-on-its feet" without significant lag time. In this manner, any other system or user processes which rely on the restarted process will experience the least amount of disruption due to the quick replacement of the process as it fails. By limiting the number of quick restarts to a certain amount (three in this example), the invention avoids over-burdening the device 100 with excessive process restart overhead operations.

After the process restarter 108 has performed the last of the quick restarts R1, R2 and R3 in the first restart sequence, upon detection of the next failure (failure F4 of restarted process R3 in this example), the process restarter 108 begins the second restart sequence 202-A (FIG. 2A), 202-B (FIG. 2B). In the example second restart sequences 202-A and 202-B, the process is restarted after waiting progressively longer restart intervals, as illustrated by the progressively incremented distances between the successive restarts R4 through R8 on time line 203. As will be explained, each of the next restart intervals, which define the amount of time to wait before restarting the process in the second restart sequence, can be determined by a number of factors.

Preferably, a restart interval (time between a failure F and the next restarts R, or one restart R and another restart R+1) and is based upon the runtime of the most recently failed process. The runtime or execution time of a set of instructions (i.e. of a process) is the time between a last process restart (e.g., time of starting R3) and the most recent process failure (e.g., time of failure detected at F4). In general terms, after the first restart, the runtime for restarted process can be determined by the formula:

RUNTIME_PROCESS_N=TIME(FAILURE_N+1)−TIME(R-ESTART_N)

The initial process runtime is simply the time between the initial process start 204 in FIGS. 2A and 2B and the first failure detection F1.

As shown by this formula, the runtime of a particular instance of a process N also indicates the failed process restart number N as well as the next process restart number N+1. As will be explained shortly, this information can be used to determine or calculate the next restart interval. The process is then restarted after expiration of the next restart interval.

In FIG. 2A, which illustrates an example of passive fault management according to the invention, each successive process restart R4, R5, R6, R7 and R8 is performed after waiting longer and longer periods of time after detecting a corresponding respective process failure F4, F5, F6, F7 and F8. Since in this example each restart interval gets incrementally longer as each process failure is detected, more and more time is provided for the fault condition which is causing the failures to correct itself. The second restart sequence attempts to balance the conflicting goals of first; trying to ensure that a process can execute for as much time as possible, and second; trying to allow a fault condition that causes the process failures to correct itself. These goals are based in part on the observation that if there is an external event causing a process to fail, the execution of the process itself may aggravate the external fault-causing event. Thus, by waiting for progressively longer periods of time after each process failure, it is a goal of the invention that the external event will be remedied before the next initiation of the process.

As indicated at the last restart position R8 208 in FIG. 2A, the process restarter 108 may eventually reach a point where it considers that restarting the process (e.g., 107) is essentially futile, and that future attempts to restart the process will result in similar failures. In this case, the process restarter 108 can simply stop restarting the process and end the second restart sequence as illustrated by the R8 OR STOP arrow. If the process restarter 108 observes that a certain number of restarted process fail, the process restarter 108 can end the second restart sequence 202-A to conserve system resources (e.g., memory space, processor time otherwise invested in restarting the process). Alternatively, the process restarter 108 may reinitiate the second restart sequence 202 again as provided in 202-B, which uses active fault management techniques in an attempt remedy the fault condition, as will be explained next.

FIG. 2B is similar to FIG. 2A in that first and second restart sequences are used to handle fault management. In the illustrated example, the first restart sequence 201 in FIG. 2B is performed just as explained above with respect to FIG. 2A. However, in FIG. 2B, the second restart sequence 202-B also includes the use of helper processes 109 started at locations (i.e., times on time line 203) H1 through H4. These helper process 210 can extensively diagnose system resources and, if active fault management is desired, can seek-out and correct fault condition(s) that may be causing the process to continually fail.

In this particular example, the first helper process H1 is executed after the failure F4 occurs in the second restart sequence 202-B. Helper processes, such as 109-1 through 109-M illustrated in FIG. 1, may be executed as separate processes and attempt to remedy the fault condition causing the process 107 to fail. The initiation of a helper process at H1 in FIG. 2B corresponds, for example, to helper process 109-1 in FIG. 1. As explained in the above discussion, there may be a single helper process 109 that executes different tasks depending upon when it is executed within the second restart sequence 202-B, or there may be different individual helper process (e.g., 109-1 through 109-M), each designed for determining and correcting specific system problems.

During the second restart sequence 202-B, the helper processes 109 executed at H1, H2, H3 and H4 preferably execute during the restart interval period (i.e. delay), after the detection of the most recent failure. That is, while the process restarter 108 is waiting for the expiration of the restart interval before the process 107 is restarted at one of positions R4 through R7, a helper process (e.g. one of 109-1 through 109-M) can be initiated at points H1, H2, H3, H4 after detection of the respective failure F4 through F7 to determine the cause of the former process failure and to remedy the failure causing situation.

It may be that a helper process 109 polls (via interface 111) various system resources such as the processor 101, input mechanisms 102, output mechanisms 103, memory/storage mechanism 104 or interconnection mechanism 105 or other processes (e.g., operating system process(s) 106) to detect problems in these mechanisms, as shown by 111. For example, a helper process 109 may detect a problem in memory 104 with a doubly linked list, such as a dangling pointer. Once a helper process 109 detects the problem, the helper process 109, for example, may supply a reset signal to the particular mechanism of concern in order to return the mechanism to is proper operating state. In the doubly linked list example, the helper process 109 may repair the pointer. In a sense, the helper processes 109-1 through 109-M can be used as agents of the process restarter 108 to seek-out and correct fault-causing events. It is to be understood that the helper process 109 while shown as a distinct process may also be a routine or procedure built in to the process restarter 108 or the operating system 106 which is executed after process failure detection.

As illustrated in FIG. 1, embodiments of the invention provide the ability of one or more of the helper processes 109 to communicate with the process restarter 108, as indicated by communication link 112. This feature of the invention allows the process restarter 108 to be made aware of the status of execution of a particular helper process 109. As such, the process restarter 108 may decide to override the decision to restart a process after expiration of the restart interval, and instead may restart the process based upon receipt of communication 112 from a helper process 109.

As an example of this aspect of the invention, suppose helper process 109-2 (FIG. 1) is executed at point H2 (FIG. 2B) in response to detecting the failure F5 of the process 107-5 (FIG. 1) restarted at R4. The helper process 109-2, which is used as the second helper process in the second restart sequence 202-B (i.e., after use of the first helper process 109-1, which may be a less robust helper processes executed at H1) can be more robust in its capabilities to determine and correct system errors which cause processing faults. As such, the helper process 109-2 might quickly determine and correct the error which caused the former process failures F1 through F5. The helper process 109-2 can communicate 112 (FIG. 1) back to the process restarter 108 to indicate that the system error or fault causing condition has been corrected. As such, the process restarter 108 may decide to reinitiate execution of the process before the complete expiration of the current restart interval (the time elapsing between F5 and R5). That is, instead of restarting the process at point R5 as shown in FIG. 2B, the process restarter 108 may actively restart the process immediately upon an indication 112 from a helper process 109 that an event causing the process failures has been corrected.

Figure 3:
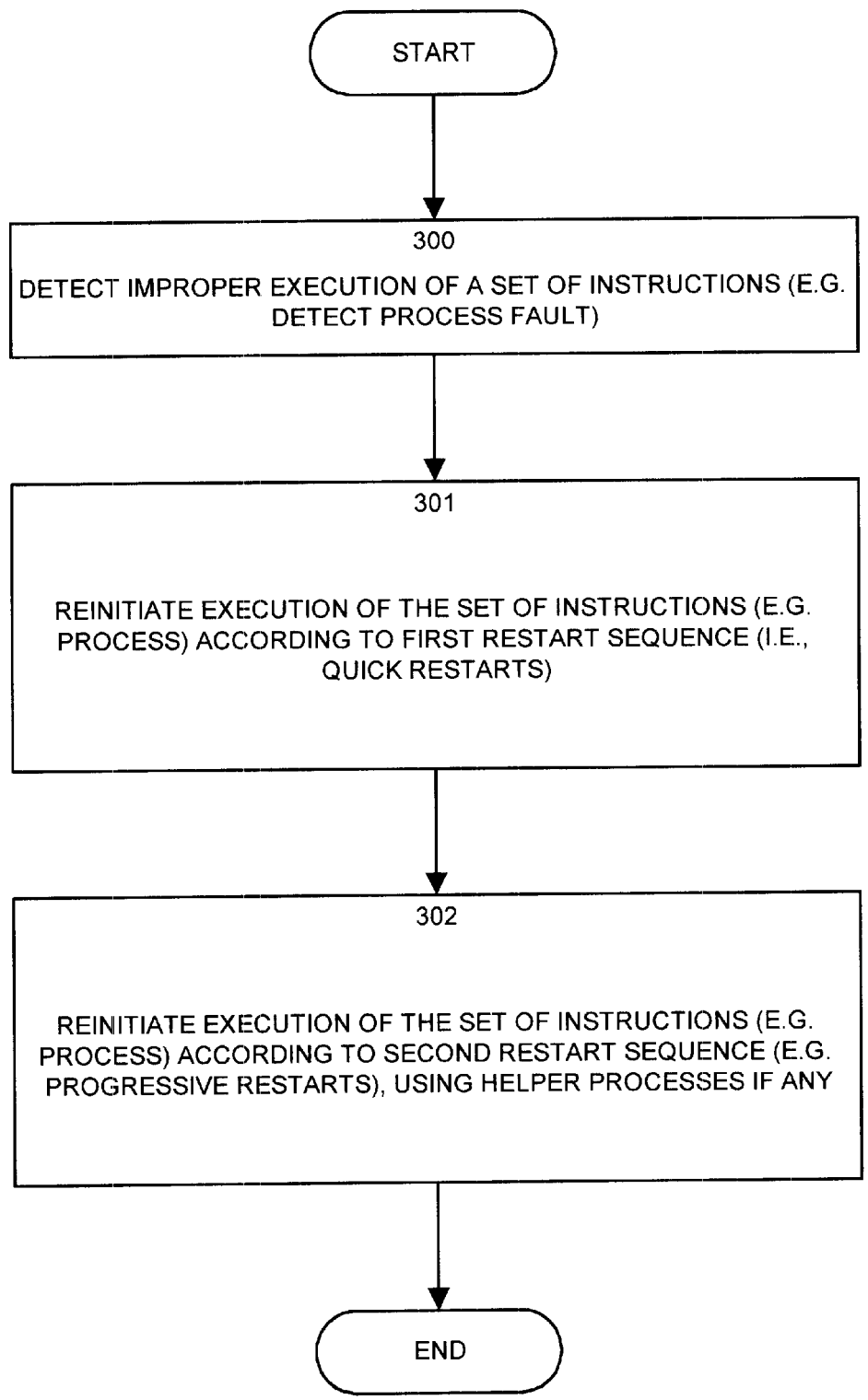
FIG. 3 is a flow chart of the general processing performed according to one embodiment of the invention.

FIG. 3 shows the general processing steps 300 through 302 performed by a computer controlled device (e.g. device 100) configured according to this invention. Processing starts at step 300 which detects improper execution of a set of instructions (e.g. process 107 in FIG. 1). Step 301 then reinitiates execution of the set of instructions according to a first restart sequence (e.g., quick restarts as explained with respect to FIGS. 1, 2A and 2B). After the first restart sequence is complete, step 302 reinitiates execution of the set of instructions according to a second restart sequence (e.g., delayed restarts as explained with respect to process restarts 107-5 through 107-N FIG. 1, and 202-A and 202-B in FIGS. 2A and 2B), using helper processes 109 if active fault management is desired.

More specifically, in step 300, the improper execution of the set of instructions may take the form of one or more of the process fault conditions discussed previously, and may be either internal to the instruction set itself, or may be an external event or fault condition having a cause unrelated entirely to the execution of the set of instructions. The set of instructions, as noted above, may be a process, program, routine, code or other executable or interpreted sequence of statements which are typically executed by the processor 101 (FIG. 1) or interpreted by another program (not shown) executing on the processor.

After step 300 detects the improper execution, step 301 reinitiates execution of the set of instructions according to the first restart sequence (e.g., 201 in FIGS. 2A and 2B). As explained with respect to the above examples, a preferred embodiment of the invention performs the first restart sequence as a series of quick restarts that are initiated immediately after detection of the improper execution in step 300. Specifically, three quick restarts were used in these examples. The first restart sequence is not limited to three restarts however. Rather, any number of user definable quick restarts may be provided. The first restart sequence may be programmed by a device administrator who may configure the number of quick restarts for use by the first restart sequence before the process restarter 108 begins operation. Alternatively, the number of quick restarts may be defined as a parameter provided by the process that is monitored in step 300. That is, upon the first initiation of the process, the process itself may specify how many quick restarts should be used by the process restarter 108 during the first restart sequence. Alternatively, the number of quick restarts may be defined in a network policy obtained by the device 100 over a communications network (not specifically shown).

It is important to understand that the term "quick" with respect to quick restart is a relative term. In one embodiment, the process restarter 108 reinitiates execution of the set of instructions (step 301) immediately after failure detection (step 300). Alternatively, a short restart interval may be provided after the detection of improper execution (i.e., failure) but before initiating re-execution of the set of instructions (i.e., restarting) in the first restart sequence. The amount of time or delay in the quick restart interval may be programmable, or user or process or network policy defined, just as the number of quick restarts is as noted above. One purpose of waiting a short time period, such as a few microseconds, before quickly restarting the process in the first restart sequence is to allow the process which experiences the improper execution to be properly cleared from memory and/or any operating system tables.

Also, a brief waiting period after step 300 in the first restart sequence can allow time for the operating system 106 or the process restarter 108 to kill the failed process. That is, if the first restart sequence is designed to detect hung or failed processes (e.g., 107) in step 300, then step 301 can include cleaning-up or killing the failed or hung process before reinitiating execution of a new version of the process.

Depending upon the complexity of the process under consideration, various modifications to step 301 should now be apparent to those skilled in the art. For example, step 301 may simply require the process restarter 108 to provide a reset or reconfigure signal to the failed or hung process 107 which may cause the process to correct or reset itself. This may constitute reinitiation of execution of the set of instructions (step 301) which make up the process.

After the first restart sequence (e.g., 201 in FIGS. 2A and 2B) in step 301 is complete, step 302 is performed which reinitiates execution of the set of instructions according to the second restart sequence (e.g., 202-A and 202-B in FIGS. 2A and 2B). If active fault management is used, helper processes (e.g. 109) can also be initiated during the second restart sequence (e.g., 202-B). Step 302 thus provides the progressive restart intervals between process restarts to allow for fault conditions to clear themselves and/or be cleared via helper processes 109. As in the first restart sequence, the second restart sequence provided by step 301 of the invention can be completely programmable. Thus, the number of progressive restarts and the time delays between each can be configured or programmed by the device administrator, or can be specified by the process or by a network policy.

In one embodiment of the invention, the pattern or sequence of progression of delays between process restarts is completely configurable or programmable within the process restarter 108. In the example given with respect to FIGS. 1, 2A and 2B, progressive restarts were used. However, the invention is not limited as such. Rather, in other sequences, the delays change according to other patterns, i.e., change geometrically, exponentially, logarithmically, incrementally, decrementally, linearly, randomly and so forth, or the delays can change in increasing or decreasing amounts between each restart. Each restart sequence can alter the behavior of the process restarter 108 in a different manner with respect to the frequency of process restarts during the second restart sequence (i.e., 202-A, 202-B in FIGS. 2A and 2B). Depending upon the application or purpose of the device 100 equipped with the invention, process restarts may be backed off according to a predetermined or changing pattern.

As explained above, the second restart sequence 202 can be passive in nature (e.g., 202-A, FIG. 2A) and can simply perform reinitiation of the set of instructions in step 302, or the second restart sequence 202 in step 302 can also include active fault management (e.g., 202-B, FIG. 2B) via the use of helper processes (e.g. 109).

The helper processes 109 used in step 302 as indicated above (in explanation of FIGS. 1, 2A and 2B) can be designed to be active and robust and can seek-out and correct a fault condition causing the improper execution of the set of instructions (step 300). An active helper process 109 can perform such tasks as resetting system components, issuing notifications to other process (e.g. signaling, killing or resetting other processes), freeing or allocating necessary resources (e.g., allocating more memory or disk space, cleaning up process which are over utilizing system resources), deleting problematic processes, and so forth. The general purpose of an active helper process 109 according to this invention is to remove the fault or deadlock that is preventing the monitored process (i.e. the process that keeps failing) from continuing. There may be a fault, communication error, system problem, memory availability problem, processor lockup, or other event that the active helper process 109 can be designed to identify, target, and remove.

Alternatively, the helper processes 109 used in step 302 may be passive in nature and can simply be used, for example, to verify or validate any operating system (e.g., 106) or process (e.g., 107) data structures or memory locations (e.g., 104) required by the continually failing process. In this instance, a passive helper process does not attempt to remedy the condition causing the improper execution. Rather, a passive helper process 109 may report its findings back to the process restarter 108, as indicated by communications 112 in FIG. 1. At this point, the process restarter 108 can determine, based on the data returned from the helper process 109-M, if it is worth continuing with the second restart sequence (i.e., continue in step 302).

Alternatively, the process restarter 108 itself in step 302 may take on the duties of actively eliminating the problem that is detected by a passive helper process 109. Thus a passive helper process 109 may be, in essence, a lightweight or thin-agent of the process restarter 108. A lightweight thin-agent, which is similar to the thin-client theory in client/server systems, essentially provides a bare bones helper process 109 that simply polls the available system resources (e.g., 101 through 105 or processes 106, etc.) for diagnostic or status data and reports this data back to the process restarter 108. The process restarter 108 can then interpret and act on this data to correct the problem.

In yet another alternative embodiment, all helper process functionality may be completely built into the process restarter 108, such that the process restarter 108 itself can be responsible for determining and correcting the problems that are causing the monitored process (e.g. 107 in FIG. 1) to continually fail during the second restart sequence.

Figure 4A:
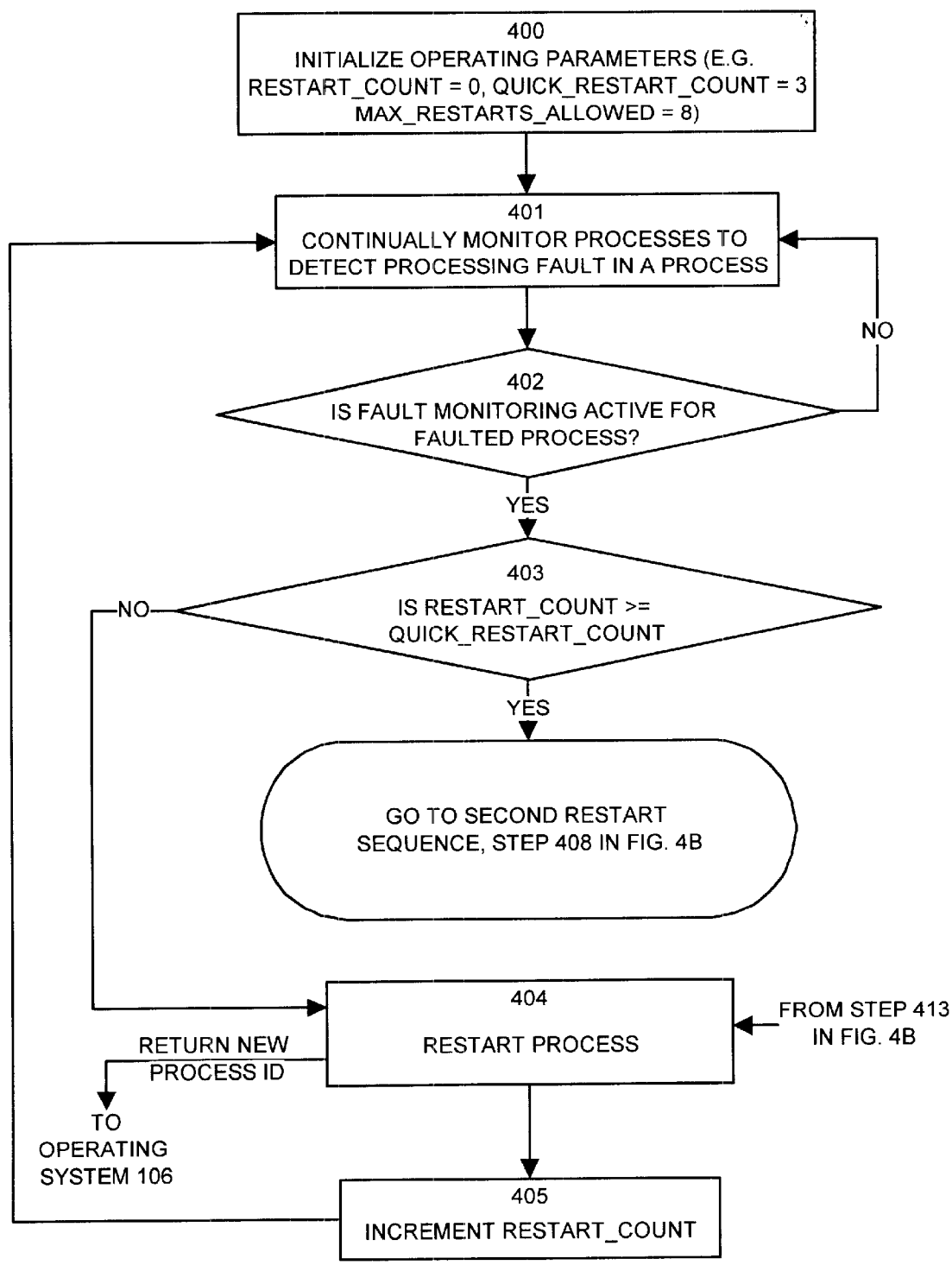
FIG. 4A is a flow chart of the processing steps which primarily illustrates details of the first restart sequence as performed by a computer controlled device configured according to one embodiment of the invention.
Figure 4B:
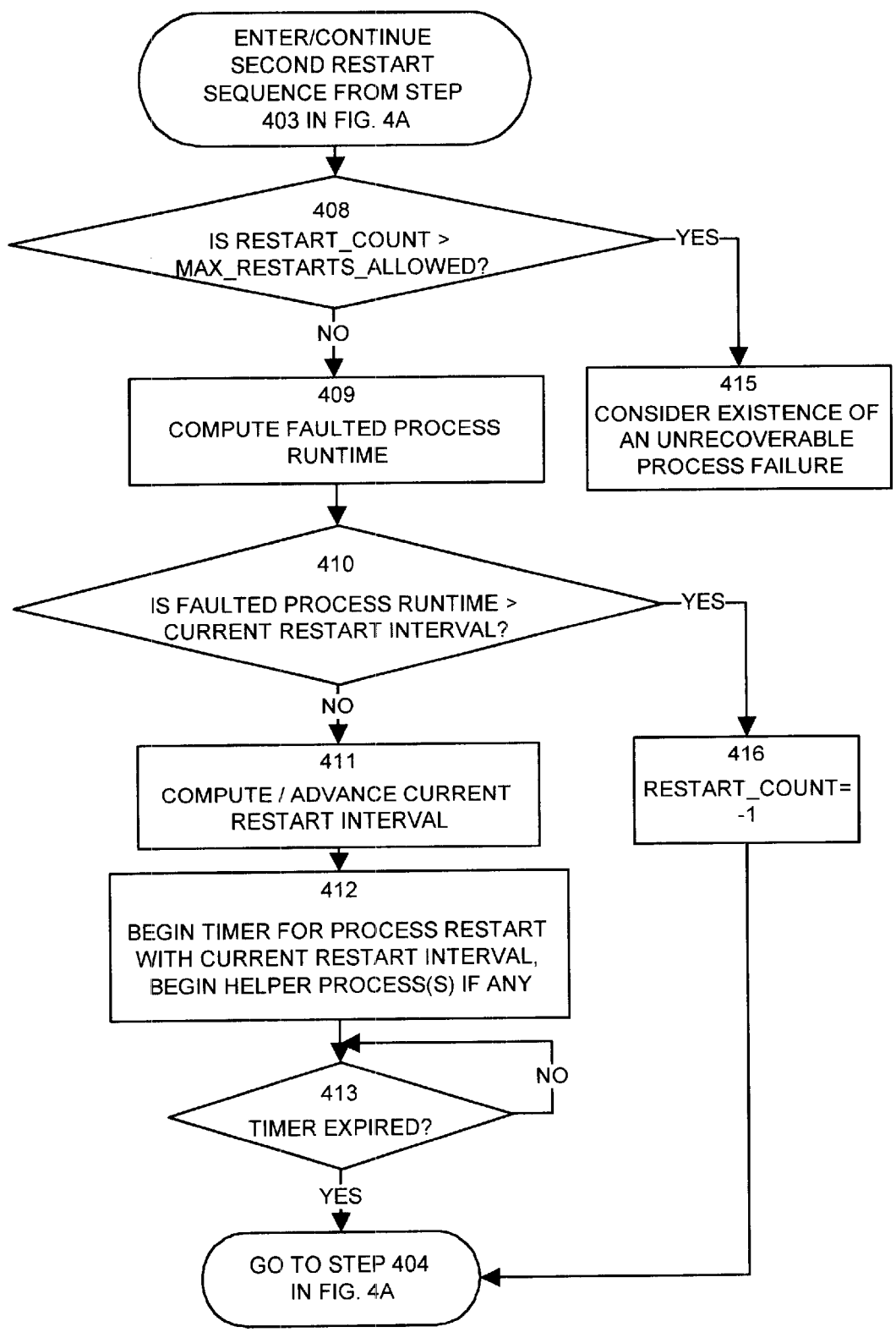
FIG. 4B is a flow chart of the processing steps which, in conjunction with FIG. 4A, illustrates details of the second restart sequence as performed by a computer controlled device configured according to an embodiment on the invention.

FIGS. 4A and 4B show the details of processing that takes place in the first and second process restart sequences (i.e., 201 and 202-A, 202-b) according to an example configuration of the invention. Preferably, the steps in FIGS. 4A and 4B are performed by the process restarter 108. Alternatively, they may be incorporated as part of the operating system 106. Assume for this example that there is already a process 107 executing, which will be referred to throughout the description of FIGS. 4A and 4B as the monitored process 107, restarted process 107, or simply the process 107.

In step 400, variable initialization is performed. In this specific example, a current restart count RESTART_COUNT is set to zero. RESTART_COUNT indicates how may process restarts have been performed at any point in time. Also in this example, QUICK RESTART_COUNT is set to three and MAX_RESTARTS_ALLOWED is set to eight. As their names imply, these two variables determine how many quick restarts are allowed in the first restart sequence, and how may restarts in total are allowed (first and second restart sequence combined), respectively.

Alternative embodiments may obtain settings for these values for step 400 from a user or device administrator who provides data or programming, or the values may be obtained from a process and operating system (106, FIG. 1) data structure called a process control block which will be explained in more detail shortly. Alternatively, a distributed network policy may specify values for these and other variables used by the processing of this invention.

In step 401, the process restarter 108 detects a processing fault in the process 107 being monitored. Step 402 then determines if fault monitoring is active for this process 107, which is assumed to be the case in this example. Step 402 is provided to allow the invention to be able to monitor multiple processes, and to process those that fail according to the first and/or second restart sequences as explained herein. Since the process 107 under consideration is being monitored by the process restarter 108, processing proceeds from step 402 to step 403 to determine if the variable RESTART_COUNT is greater than or equal to the value of the variable QUICK_RESTART_COUNT, which is set to three in this example. Since RESTART_COUNT is initially set to 0, the maximum number of quick restarts (e.g., three) provided by the first restart sequence (e.g., 201 in FIGS. 2A and 2B) of this example embodiment have not been used up. Thus, processing proceeds to step 404 where the process 107 is restarted.

Step 404 can also return a new process ID for record keeping or operating system 106 purposes, and then step 405 increments the RESTART_COUNT variable. In this execution of step 405, the RESTART_COUNT is set to a value of one. Processing then returns to step 401 which monitors the restarted process for a fault condition indicating improper execution. Upon the next occurrence of a fault condition in the monitored process 107, processing proceeds through steps 401 through 405 as explained for the first process failure. Each time the process fails, if the maximum number of quick restarts indicated by QUICK_RESTART_COUNT has not yet equaled or exceeded the value of RESTART_COUNT (i.e., step 403), a quick restart is performed by proceeding directly from step 403 to step 404. The looping of steps 401, 402, 403, 404 and 405 comprises the first restart sequence in this example embodiment.

After a certain number of quick restarts have been performed (i.e., during the first restart sequence), step 405 eventually increments the RESTART_COUNT variable to be equal to or greater than the value of QUICK_RESTART_COUNT. When this occurs, upon the next process failure detected in step 401, processing proceeds from step 403 to step 408 in FIG. 4B. This can also occur if the QUICK_RESTART_COUNT is initially set to zero in Step 400. In this case, the first restart sequence and hence quick restarts are not performed at all and the process restarter 108 will go directly to the second restart sequence step 408 in FIG. 4B upon the first processing failure detection.

Step 408 determines if the current value of the variable RESTART_COUNT has exceed the maximum number of process restarts indicated by the variable MAX_RESTARTS_ALLOWED, which has a value of eight (from step 400) in this example. If the number of failures causes the RESTART_COUNT to be incremented (Step 405) beyond a maximum allowed amount (eight in this example), step 415 is processed and the process restarter 108 determines that an unrecoverable process failure has occurred which may be signaled to the operating system 106 to indicate that the fault management cannot successfully restart the failed process 107. Alternatively, if fault management was only passive and both the first and second restart sequences failed to successfully restart the process, step 415, while not illustrated in this example, may repeat the second restart sequence using the active fault management techniques explained herein.

If step 408 determines that there are still process restarts remaining, processing proceeds to step 409. Step 409 computes the faulted process runtime using, for example, the formula provided previously. Essentially, the faulted process runtime provides an indication of how long the faulted process executed before failing. Step 410 is then processed which determines if the faulted process runtime is greater than a current restart interval (to be explained shortly). The current restart interval generally depends upon how many failures have thus far occurred in the second restart sequence and indicates a period of time to wait before again restarting the faulted process 107.

In this example embodiment, the step 410 essentially decides that if the faulted process 107 executed for a longer period of time than the amount of time to delay before restarting the process after detecting the most recent fault (e.g. the current restart interval), then the error causing the present process fault is considered unrelated to the former process faults. As such, processing proceeds to step 416 where the RESTART_COUNT is reset to negative one (−1) and processing then proceeds to step 405 to return to the fault detection step 401. Generally, if step 410 finds that the most recently failed process 107 executed (i.e., has a runtime) longer than the current time interval that is to be delayed before restarting the process 107, then the process 107 executed a significant amount of time, and did not just fault immediately after its restart. Since the failed process 107 executed for a significant amount of time, chances are that its failure is not due to the same set of circumstances as a former process failure. As such, step 410 in this example embodiment allows the processing of the invention to return to a fault management scenario that begins again with the first restart sequence by resetting the RESTART_COUNT to −1 which causes the next detected process failure (step 401), no matter how far distant in time, to begin the first restart sequence (e.g., 201) over again.

If however, step 410 determines the faulted process runtime (computed in step 407) is not greater than the current restart interval, the process advances to step 411 to compute or advance to the next restart interval (i.e., the next current restart interval).

The restart intervals themselves may, for example, be kept in a table, list, or other data structure which matches restart counts with restart time intervals. An example restart interval table is illustrated in Table 1 below.

TABLE 1

Restart Interval Table

| RESTART_COUNT | CURRENT RESTART INTERVAL |
| --- | --- |
| 1 | 1 microsecond |
| 2 | 1 microsecond |
| 3 | 1 microsecond |
| 4 | 20 microseconds |
| 5 | 40 microseconds |
| 6 | 80 microseconds |
| 7 | 160 microseconds |
| 8 | 320 microseconds |

The restart table shown in Table 1 is an example of a first restart sequence having a short constant delay interval (1 microsecond) before each quick restart followed by a second restart sequence having increasing restart intervals between the delayed restarts. As indicated in the table, the first three restarts (RESTART_COUNT=1, 2, 3) are the quick restarts and have only 1 microsecond of delay to allow the failed process to be cleared by the operating system 106. While not shown in the embodiments of the first restart sequence previously discussed, this table may be used by the first restart sequence (e.g., 201) to determine a short restart interval (e.g., 1 microsecond) to delay before each of the quick restarts (i.e., a delay between F1 and R1, F2 and R2 and F3 and R3 in FIGS. 2A and 2B). Generally, for the first restart sequence (201), the current restart interval is the same for each quick restart and is relatively small (e.g., 1 microsecond as in this example).

However, with respect to the second restart sequence (e.g., 202-A, 202-B in FIGS. 2A and 2B), as the number of process restarts increases (R4 through RN), the current restart interval (Column 2 in Table 1 above) which indicates the delay to wait before restarting the process grows progressively longer in this example. As a specific example, before the fourth restart, a delay of 20 microseconds is provided for the fault condition to pass. Upon the eighth restart, a delay of 320 microseconds is enforced.

Step 411 computes or advances the current restart interval. In this example, step 411 simply selects the next restart interval delay value in the table. In an alternative embodiment, step 411 may not require a restart interval table, but rather, may use a formula or other calculation to determine when the process restart should occur. As noted above, various formulas such as geometric, exponential, logarithmic, incremental, progressive, linear or random or others can be used to mathematically determine when the next process restart should occur.

After step 411 is complete, step 412 then begins a timer for restarting the process using the current process restart interval selected or computed in step 411, and begins execution of any helper process (109), as explained above. If multiple helper processes are available (i.e., 109-1 through 109-M), the appropriate one(s) may be selected as specified by the failed process, or selection may be based on the current restart interval, or on the runtime, or on the current value of the RESTART_COUNT variable, or on another factor such as a signal returned from the failing process 107 indicating why the failure may have occurred. In this manner, various helper processes 109 containing different levels of active or passive fault management processing for specific problems or events can be dispatched and used at the appropriate times depending upon the state of the second restart sequence. As an example, there may be memory specific helper processes 109-1, communications specific helper processes 109-2, and processor specific helper processes 109-3. Depending upon the state of the failed process 107 or upon how far processing has proceeded into the second restart sequence (as indicated by the current restart interval), any one or more of these helper processes 109 may be selected and dispatched (i.e., executed) in step 412 to diagnose and fix the fault or change system conditions so the fault does not effect process 107.

The timer set in step 412 based on the current restart interval may be set in a variety of ways according to variations in the invention. The timer may, for example, be based using time zero set from the time of process failure. Alternatively, time zero may be based upon the runtime of the most recently failed process. That is, step 412 begins a timer, which upon expiration, causes the process to be restarted. This timer may be started at zero as soon as step 412 is executed. Alternatively, the timer may be set relative to the time the process failure was detected in step 401. In this case, the current restart interval determines the time to wait as measured from process failure to process restart. Alternatively still, the timer may be set relative to when the former failed process was first formerly started, which can be computed using the runtime determined in step 409. In the later case, the current restart interval, and hence the delay before restarting the process, are both relative to when the former failed process was started.

In step 413, when the timer set in step 412 expires, processing proceeds to step 404 in FIG. 4A at which point the process is restarted. Step 405 then increments the RESTART_COUNT and returns to step 401 to continue with failure detection. It is anticipated that the use of helper processes 109 and delayed restarts according to the second restart sequence will allow the restarted process 107 to correctly execute as the fault may have disappeared or may have been cleared by the helper process(s) 109.

Information related processes that are present on a device 100 is typically maintained by the operating system 106 (FIG. 1), or may be maintained by the process restarter 108 of this invention. Typically, every process that exists in any state (normal, hung, looping, crashed, etc.) is tracked by the operating system in a data structure called a process control block. There is generally one process control block for each process 107 on a device 101. A process control block data structure configured according to this invention can include information related to assisting the fault management processing explained herein. An example portion of a process control block configured according to the invention and presented in a C-like programming language format is provided below.

Portions of a Process Control Block

```
Typedef struct sysmgr_pcb_struct
{
    struct            sysmgr_pcb_struct next;  /*link to next pcb node for list of monitored
                                                 processes*/
    unsigned int      job_id;                  /*Job/Process ID of the current process*/
    char              *name;                   /*Current process name*/
    char              *helper_name;            /*Name or List of helper process(s), if
                                                 needed*/
    char              *helper_path;            /*Path to load helper process(s)*/
    char              *helper_args;            /*Arguments to helper process(s)*/
    char              *path;                   /*Path to load current process*/
    char              *args;                   /*Current process Arguments*/
    char              argc                     /*Current process argument count*/
    int               restart_enabled          /*Current Process restart/respawn
                                                 enabled?*/
    int               current_restart_count    /*Current process restart counter*/
    unsigned int=3    1_restart_count          /*First restart sequence interation count,
                                                 system default equals 3 quick restarts,
                                                 this field is user programmable*/
    unsigned int=0    1_restart_time           /*First restart sequence time between quick
                                                 restarts, system default equals 0
                                                 microseconds wait, this field is user
                                                 programmable*/
    unsigned int=10   2_restart_count          /*Second restart sequence interaction count,
                                                 system default equals 10 progressive
                                                 restarts, this field is user programmable*/
    unsigned int=20   2_restart_time           /*Second restart sequence time for the first
                                                 progressive restart interval, system default
                                                 equals 20 microseconds wait-time for first
                                                 interval of second restart sequence, this field
                                                 is user programmable */
    char              *2_restart_formula       /*Pointer to progressive restart formula for
                                                 second restart sequence, logarithmic,
                                                 geometric, exponential, etc. . . . The formula
                                                 used can be selected or programmed by the
                                                 user*/
    int               dump_core                /*Dump core on current process fault?*/
    unsigned int      max_core                 /*Maximum number of cores to dump*/
    char              *tuple                   /*Config path for dynamic creation*/
    int               debug                    /*debug number, to test process/helper*/
```

-continued

Portions of a Process Control Block

```
    ...
    ...
    ...
}
```

As indicated in the above portion of the process control block data structure, various variables are supplied that assist in the fault management processing techniques provided by this invention. For example, helper_name, helper_path and helper_args are three variables that may be maintained for each process 107 which specifies the specific names, locations and arguments to be supplied to the helper process(es) used during the second restart sequence (e.g., 202-B in FIG. 2B). Other variables such as restart_enabled and restart_count allow the process restarter 108 to determine if process restarting according to this invention is enabled for this process and if so, indicate the current restart count for the process. The 1_restart_count and 1_restart_time variables can be used to specify, respectively, how many first restart sequence (201) process restarts (R1–R3 in FIGS. 2A and 2B) are to be performed, and how much time is to be delayed between these quick restarts. Similar variables are provided for the second restart sequence (202), except that the variable 2_restart_formula can be used to indicate a formula to use to determine successive restart intervals during the second restart sequence of this invention.

It is to be understood that this process control block is an example only and that modifications or adjustments to the process control block are contemplated as embodiments of the invention. For example, instead of specifying default values for the number of restarts, the device administrator can provide this information to the process restarter 108 and the process control block can be made smaller, without the need for this information. Also, the information maintained in the process control block can be obtained as part of the process itself and supplied during initial process startup, or may be obtained from a network policy that is distributed to the device 100, or may be programmed by a device administrator or user.

While this invention has been particularly shown and described with references to preferred embodiments thereof, it will be understood by those skilled in the art that various changes in form and details may be made therein without departing from the spirit and scope of the invention as defined by the appended claims. For example, while the aforementioned descriptions explained the invention with respect to monitoring the fault conditions of a single process, the process restarter 108 on the invention can preferably monitor and handle fault management for more than one process at a time.

In another alternative embodiment, if the passive versions of the first and second process restart sequences do not successfully revive a failing process, the passive second restart sequence can be followed by an active version of the second restart sequence. This embodiment saves processing resources during the passive first and second restart sequences, and if needed, uses the most processing (due to helper process execution) only during the second, active iteration of the second restart sequence.

It should be understood that the invention provides more reliable operation than conventional computer controlled devices that do not offer the aforementioned features of the invention. Accordingly, such features are well suited for a data communications device, or any other device requiring a certain level of protection from faults that may occur in processing. Alternatively, the invention may be embodied completely within software, such as in an operating system. Examples of computer operating systems in which the present invention can be implemented, other than the aforementioned Cisco IOS which is designed for data communication devices, are the Microsoft Corporation line of operating systems including Windows 3.X, 95, 98, NT and Windows 2000, produced by Microsoft Corporation of Redmond, Wash.

It is also to be understood that the foregoing description of embodiments of the invention are not intended to be limiting. Rather, the invention is defined by the following claims and their equivalents.

What is claimed is:

1. A method of handling processing faults in a computer system, the method comprising the steps of:
   detecting improper execution of a set of instructions;
   initiating execution of the set of instructions in response to the step of detecting;
   repeating the steps of detecting and initiating in a first timing pattern according to a first restart sequence; and
   repeating the steps of detecting and initiating according to a second restart sequence, wherein the second restart sequence initiates execution of the set of instructions in a second timing pattern, the second timing pattern being different than the first timing pattern of the first restart sequence.

2. The method of claim 1 wherein the first restart sequence repeats each step of initiating without a lag time, in response to the step of detecting.

3. The method of claim 1 wherein the first restart sequence includes the steps of:
   detecting a fault condition associated with the set of instructions; and
   determining if the fault condition exceeds a maximum number of fault conditions associated with the first restart sequence, and if not, performing the step of initiating execution of the set of instructions, such that upon each successive step of detecting and initiating according to the first restart sequence, execution of the set of instructions is initiated without a lag time.

4. The method of claim 1 wherein the second restart sequence performs each step of initiating in response to the step of detecting after expiration of a current time interval that is different than a former time interval of a former repetition of the second restart sequence.

5. The method of claim 4 wherein the current time interval is greater than the former time interval.

6. The method of claim 1 wherein each repetition of the second restart sequence initiates execution of the set of instructions after waiting progressively longer time intervals in response to the step of detecting.

7. The method of claim 1 wherein the second restart sequence includes the steps of:

determining a runtime for the set of instructions;

determining a next restart interval based on the runtime for the set of instructions;

performing the step of initiating execution of the set of instructions after expiration of the next restart interval; and wherein upon each repetition of the second restart sequence, the next restart interval is different.

8. The method of claim 7 wherein the next restart interval determined in each successive repetition of the second restart sequence is progressively longer in duration than a next restart interval determined in a former repetition of the second restart sequence.

9. The method of claim 7 wherein the step of determining a next restart interval uses the runtime for the set of instructions to select a next restart interval from a set of next restart intervals associated with the second restart sequence.

10. The method of claim 7 wherein the step of determining a next restart interval determines if the runtime for the set of instructions is less than a current restart interval, and if so, advances the next restart interval based on the current restart interval.

11. The method of claim 7 further including the step of determining if the runtime for the set of instructions exceeded a current restart interval, and if so, initiating execution of the set of instructions and terminating the second restart sequence.

12. The method of claim 1, wherein a restart interval determining a time between the steps of detecting and initiating in at least one of the first and second restart sequences is programmable.

13. The method of claim 1 wherein a restart interval determining a time between the steps of detecting and initiating in at least one of the first and second restart sequences is computed based on a formula based on at least one of a geometric, an exponential, a logarithmic, an incremental, a progressive, a linear, an increasing, a decreasing and a random pattern.

14. The method of claim 1 wherein the step of initiating in the second restart sequence is performed at an elapsed time interval measured from a former step of detecting.

15. The method of claim 1 wherein the step of initiating in the second restart sequence is performed at an elapsed time interval measured from a former step of initiating.

16. The method of claim 1 wherein the step of detecting improper execution of a set of instructions detects a fault due to a resource required by the set of instructions.

17. The method of claim 1 wherein the step of detecting improper execution of a set of instructions detects a fault due to a hung process required by the set of instructions.

18. The method of claim 1 further including the steps of:

initiating execution of a set of helper instructions in response to the step of detecting improper execution of a set of instructions, the set of helper instructions performing functions to diagnose and handle processing faults in the computer system causing the improper execution of the set of instructions.

19. The method of claim 18 wherein the set of helper instructions executed is selected from a plurality of sets of helper instructions in which each set is designed to identify a specific fault condition related to the improper execution of the set of instructions.

20. The method of claim 7 wherein the second restart sequence further includes the steps of:

initiating execution of a set of helper instructions in response to the step of detecting improper execution of a set of instructions during the second restart sequence, the set of helper instructions performing functions to assist in the handling of processing faults in the computer system.

21. The method of claim 20 wherein the step of initiating execution of the set of helper instructions selects the set of helper instructions to be executed based upon the next restart interval.

22. A method for handling faults in a computer system, the method comprising the steps of:

detecting a fault condition which causes improper execution of a set of instructions;

determining a period of time to wait in response to detecting the fault condition;

waiting the period of time in an attempt to allow the fault condition to be minimized;

initiating execution of the set of instructions after waiting the period of time;

repeating the steps of detecting, determining, waiting and initiating, wherein each repeated step of determining a period of time determines a time period based on a formula based on at least one of a geometric, an exponential, a logarithmic, an incremental, a progressive, a linear, an increasing, a decreasing and a random pattern.

23. The method of claim 22 further comprising the steps of:

initiating execution of a set of helper instructions to diagnose and correct the fault condition, the step of initiating execution of a set of helper instructions being performed concurrently with the step of waiting the period of time.

24. A method for fault management in a computer controlled device, the method comprising the steps of:

detecting a fault condition associated with a process;

determining a runtime for the process;

determining a restart interval based on the runtime for the process;

executing a helper process associated with the restart interval to diagnose and remedy the fault condition associated with the process, the helper process executing within the restart interval;

initiating execution of the process after expiration of the restart interval.

25. A computer controlled device comprising:

a processor;

an input mechanism;

an output mechanism;

a memory/storage mechanism;

an interconnection mechanism coupling the processor, the input mechanism, the output mechanism, and the memory/storage mechanism;

the memory/storage mechanism maintaining a process restarter that executes in conjunction with the processor, the process restarter detecting improper execution of a set of instructions on the processor and initiating execution of the set of instructions in response to detecting improper execution, the process restarter repeatedly performing the detecting and initiating operations in a first timing pattern according to a first restart sequence, and the process restarter repeatedly performing the detecting and initiating operations according to a second restart sequence, wherein the second restart sequence causes the process restarter to initiate execution of the set of instructions in a second timing pattern, the second timing pattern being different than the first timing pattern of the first restart sequence.

26. The computer controlled device of claim 25 wherein:

the process restarter, in the second restart sequence, performs the operation of detecting, and then waits for expiration of a restart interval before performing the operation of initiating; and wherein each restart interval between successive repetitions of the second restart sequence becomes progressively longer in duration.

27. The computer controlled device of claim 25 wherein each restart interval is computed based on a formula based on at least one of a geometric, an exponential, a logarithmic, an incremental, a progressive, a linear, an increasing, a decreasing and a random pattern.

28. The computer controlled device of claim 25 further including a helper process that resides in the memory/storage mechanism and executes in conjunction with the processor, the helper process executing during the expiration period of the restart interval during the second restart sequence in order to diagnose and correct at least one fault condition causing the improper execution of the set of instructions.

29. A computer controlled device comprising:

a processor;

an input mechanism;

an output mechanism;

a memory/storage mechanism;

an interconnection mechanism coupling the processor, the input mechanism, the output mechanism, and the memory/storage mechanism;

means for detecting a fault condition associated with a process stored in the memory/storage mechanism;

means for determining a runtime for the process;

means for determining a restart interval based on the runtime for the process;

means for executing a helper process associated with the restart interval to diagnose and remedy the fault condition associated with the process, the helper process executing within the restart interval;

means for initiating execution of the process after expiration of the restart interval; and means for repeating operation of the means for detecting, means for determining, means for executing, and means for initiating at restart intervals that differ from one repetition to a next repetition.

30. The computer controlled device of claim 29 wherein the device is a data communications device and the restart intervals get progressively longer from one repetition to a next repetition.

31. A computer program product having a computer-readable medium including computer program logic encoded thereon for controlling faults in a computer controlled device, such that the computer program logic, when executed on at least one processing unit within the computer controlled device, causes the at least one processing unit to perform the steps of:

detecting improper execution of a set of instructions;

initiating execution of the set of instructions in response to the step of detecting;

repeating the steps of detecting and initiating in a timing pattern according to a first restart sequence; and repeating the steps of detecting and initiating according to a second restart sequence, wherein the second restart sequence initiates execution of the set of instructions in a second timing pattern, the second timing pattern being different than the first timing pattern of the first restart sequence.

32. The computer program product of claim 31 wherein the computer program logic when executed on the at least one processing unit, further causes the second restart sequence performed on the at least one processing unit to further perform the steps of:

determining a runtime for the set of instructions;

determining a next restart interval based on the runtime for the set of instructions;

performing the step of initiating execution of the set of instructions after expiration of the next restart interval; and wherein upon each repetition of the second restart sequence, the next restart interval is different.

33. The computer program product of claim 31 wherein the computer program logic is embedded within an operating system for a computer controlled device.

34. A process control block data structure maintained in a computer readable medium, the process control block data structure maintaining information about an instantiation of a process and information about at least two restart sequences used to reinitiate the process in the event of a failure of the process, the at least two restart sequences having different respective timing patterns.

35. A propagated data signal representing a process control block data structure, the process control block data structure maintaining information about an instantiation of a process and information about at least two restart sequences used to reinitiate the process in the event of a failure of the process, the at least two restart sequences having different respective timing patterns.

* * * * *